July 30, 1940.  A. E. LONG  2,209,783
TIME RECORDER
Filed Dec. 17, 1936  4 Sheets-Sheet 1

INVENTOR.
Albert E. Long, Deceased.
by Florence B. Long,
Administratrix.
By H H Hulse
Attorney.

July 30, 1940.  A. E. LONG  2,209,783
TIME RECORDER
Filed Dec. 17, 1936  4 Sheets-Sheet 2

INVENTOR.
Albert E. Long, Deceased
by Florence B. Long,
Administratrix.
By H. H. Hulse
Attorney.

July 30, 1940.   A. E. LONG   2,209,783
TIME RECORDER
Filed Dec. 17, 1936   4 Sheets-Sheet 3

INVENTOR.
Albert E. Long, Deceased.
by Florence B. Long,
Administratrix.
By H. H. Hulse
Attorney.

July 30, 1940.  A. E. LONG  2,209,783
TIME RECORDER
Filed Dec. 17, 1936  4 Sheets-Sheet 4

INVENTOR.
Albert E. Long, Deceased.
by Florence B. Long.
Administratrix.
By H. H. Hulse
Attorney.

Patented July 30, 1940

2,209,783

UNITED STATES PATENT OFFICE 2,209,783

TIME RECORDER

Albert E. Long, deceased, late of Chicago, Ill., by Florence B. Long, administratrix, Chicago, Ill., assignor, by mesne assignments, to General Time Instruments Corporation, New York, N. Y., a corporation of Delaware Application December 17, 1936, Serial No. 116,316

6 Claims. (Cl. 234—43)

The present invention relates in general to time recorders and more particularly to workmen's in-and-out time recorders. The invention is an improvement over that disclosed in the co-pending Long application Serial No. 734,767, filed July 12, 1934, and the main object of the present invention is to provide an improved lateral shifting mechanism for adjusting the lateral position of the imprint on the record sheet.

The shifting mechanism disclosed in said prior Long application required the use of two hands to effect an adjustment of the lateral position of the type wheels and card receiver. This is objectionable in that a workman carrying a lunch pail or other package would be forced to put down the article before he could adjust the recorder to print in the proper column on his card, in case he found it necessary to make such adjustment before operating the recorder. Since a manual shift recorder such as disclosed is especially adaptable to establishments in which employees have varying working hours, that is, in which some may leave after others start in the morning and in which the lunch hours may be different so that some employees are going out to lunch while others are returning, each employee must check to see that the recorder is properly adjusted to print in the proper column on his card whether he be leaving or entering and must make the proper adjustment if necessary. A lateral shift mechanism which requires both hands of the operator for its operation is, therefore, a great inconvenience to the employees.

It is, therefore, the object of the present invention to provide a lateral shift mechanism which may be easily and quickly operated by only one hand of the operator and by the same hand which inserts the card in the card receiver.

It is a further object of the invention to provide a simple lateral shifting mechanism in which the control members are located at and form a part of the funnel of the card receiver so that the hand which inserts a card into the receiver is automatically in position to operate the shift mechanism in case it is necessary to do so.

The above and other objects not specifically mentioned at this time will best be understood from a perusal of the following specification when read in connection with the accompanying drawings, comprising Figures 1 to 5, inclusive, in which.

Figure 1:
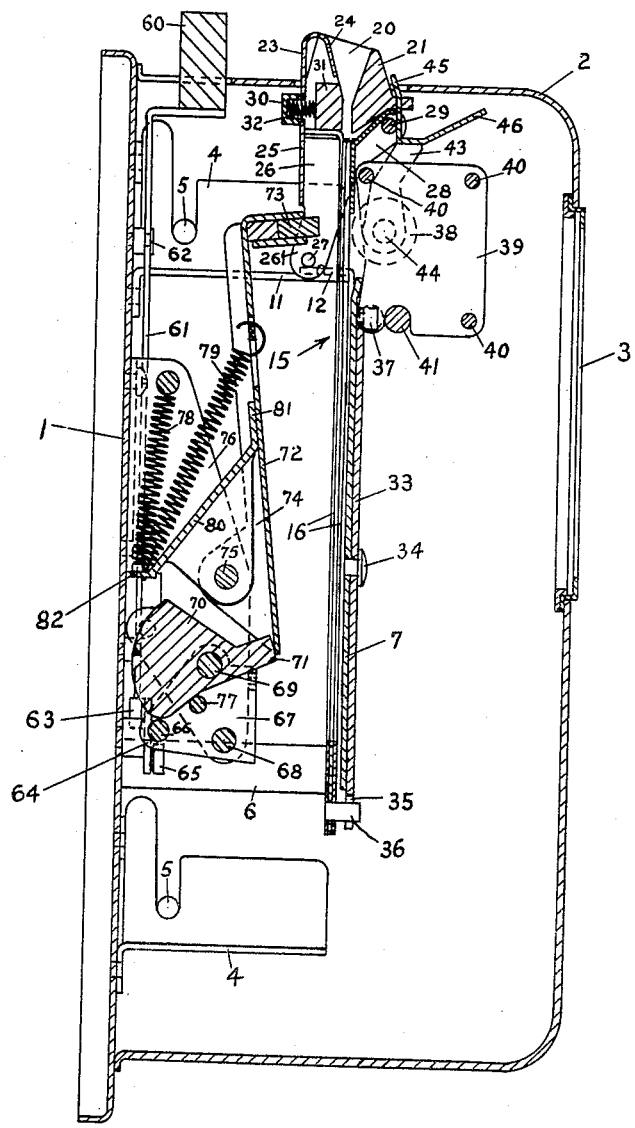
Fig. 1 is a cross-sectional view of a time recorder embodying the present invention, certain parts not directly concerned with the invention having been omitted for the sake of clearness.
Figure 2:
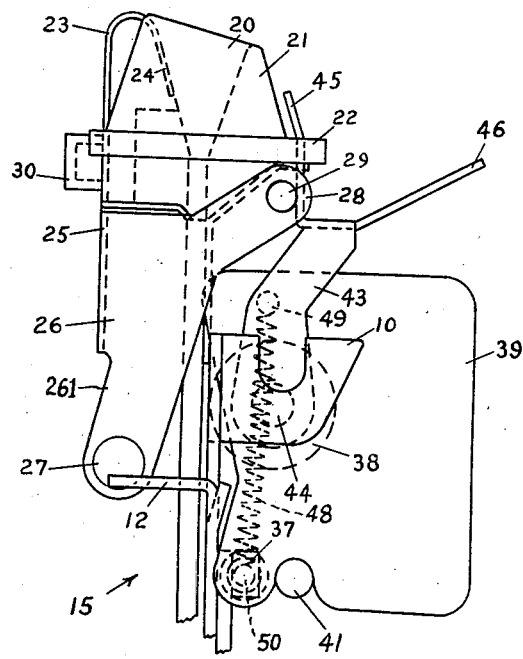
Fig. 2 is a side elevation of the card receiver, the type wheel carriage and the lateral shifting mechanism.
Figure 2:
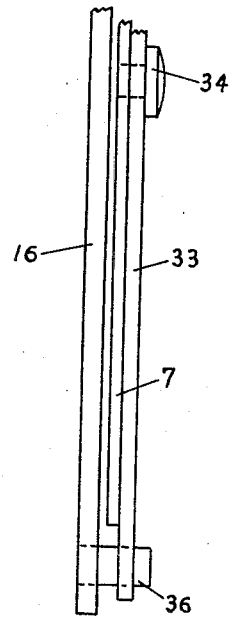
Figure 4:
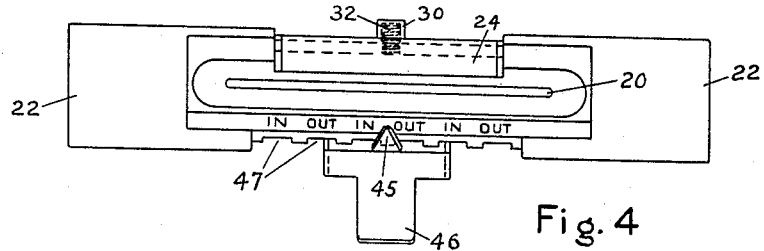
Fig. 4 is a top view of Fig. 3.

Referring to the drawings, the essential parts of the time recorder shown comprise a base plate 1 to which are secured four mounting brackets 4 and two supporting posts 6. The rear base plate also mounts the printing hammer assembly and the operating mechanism therefor. Removably mounted on the base plate is an intermediate mounting plate 7. This plate has two rearwardly extending ears 12 provided with holes which fit over and are engaged by upwardly extending studs secured to the horizontal plates or ears 11 formed from the two upper mounting brackets 4. The lower corners of the intermediate plate 7 are secured to the base plate by screws which pass through holes in the plate 7 and are threaded into the two posts 6. Thus the plate 7 is securely attached to the base plate 1 but may be easily and quickly taken off by removing the two screws and then lifting the plate to disengage the ears 12 from the studs on brackets 4.

Mounted on the intermediate plate 7 are the card receiver assembly, indicated generally at 15, and the ribbon 9, ribbon spools 8 and ribbon feed mechanism (not shown). Also secured to the plate 7 are the brackets 10 which support the front sub-assembly containing the type wheel carriage (diagrammatically indicated in the drawings) and the clock dial assembly and type wheel and clock hand operating mechanism (not shown).

The entire operating mechanism of the recorder is enclosed by a cover 2, having a window 3 through which the clock dial is visible, which fits against the base plate 1. Four studs or posts 5 extend inwardly from the sides of the cover and engage recesses in the four mounting brackets 4 to hold the cover tightly against the base plate when it is in proper position.

The hammer 72 is pivotally mounted at 75 between the two vertically extending brackets 76 secured to the rear base plate. The hammer withdrawal and releasing mechanism is controlled by the manually operable member 60 located adjacent to and extending parallel to the card receiver funnel 20 so that it may be operated by the hand while inserting a card into the card receiver. The member 60 is connected to two vertically extending push rods 61 which are slidably fastened to the base plate 1 by pin and slot connections such as indicated at 62. The lower ends of the push rods 61 rest upon rollers 63 mounted on one end of rock levers 64, the rollers 65 being mounted on the other ends of such rock levers. These rollers 65 lie directly beneath the rod or pillar 66 extending between two plates 67 which are held in parallel relation by pillars, and the unit is pivotally mounted at 68 between the supporting brackets 76. The plates 67 have laterally extending portions or ears which abut against the front edges of brackets 76 and to which are connected springs which maintain the plates in the position shown in the drawings with the rod or pillar 66 bearing on the rollers 65 thereby maintaining the operating pushbar 60 and the push rods 61 in their uppermost position.

Pivotally mounted on a rod or shaft 69 extending between the two plates 67 is an operating dog 70 having an arcuate portion 71 engageable with and slidable along a wear plate at the lower end of hammer 72. This operating dog has a downwardly extending weighted tail which engages a stop pin 77 extending between the two plates 67. When the push bar 60 is depressed by the hand of the operator, the movement thereof is transmitted to the push rods 61 and thence to the rock levers 64. The rollers 65 engage and raise the rod 66 causing a clockwise rotation of the plates 67 about pivot 68. The operating dog 70 is pivoted between these plates near their upper ends at 69 and, therefore, the pivot 69 is moved to the right causing the dog to push the lower end of the hammer to the right and resulting in a counter-clockwise rotation of hammer 72 about its pivot 75. As the operating dog moves to the right, the stop pin 77 prevents its rotation about its pivot point 69 and therefore the arcuate portion which is in engagement with the wear plate on hammer 72 is gradually lowered until it becomes disengaged from the hammer and allows the hammer to fly forward in its printing blow under power of its operating springs as will be described later.

In order to enable the final printing action of the hammer to take place under its own momentum and also to cause a partial withdrawal of the hammer after printing to bring it in position for reengagement with the hammer actuating mechanism, a spring lost-motion connection is provided between the hammer actuating spring 78 and the hammer 72. This lost motion spring connection comprises a rock member 80 having downwardly extending ears by means of which it is pivotally mounted on brackets 76 coaxially with hammer 72 on shaft 75, which shaft passes through such ears on member 80 and also through the rearwardly extending wings 74 of hammer 72. An abutment portion 81 of rock member 80 is normally held in engagement with the main body of hammer 72 by means of the spring 79 which is connected at its upper end to hammer 72 and at its lower end to a rearwardly extending flat plate portion of rock member 80. This rearwardly extending portion of member 80 has two laterally extending ears 82 which are normally held against the lower edges of those portions of brackets 76 which form the top of the cut-out sections of the brackets by means of the operating spring 78 which is connected at its lower end to the rearwardly extending flat plate portion of rock member 80 and at its upper end to a post or pillar extending between brackets 76.

When the pushbar 60 is depressed by the operator as previously described and the lower end of hammer 72 is moved to the right (as viewed in Fig. 1) the hammer 72 and the rock member 80 are both rotated in a counter-clockwise direction about pivot point 75. This withdrawal movement of the hammer tensions the hammer operating spring 78. When the end 71 of the operating dog 70 slips off of the lower end of hammer 72, the hammer is snapped forward by spring 78 until the ears 82 of rock member 80 engage the stop edges of the supporting brackets 76. The rock member 80 is, therefore, stopped in this position but the momentum of the hammer carries it forward to deliver its printing blow, stretching the spring 79 which connects the rock member with the hammer. After it has delivered its printing blow the hammer is returned to the position shown in Fig. 1 by the spring 79 with the abutment portion 81 of rock member 80 abutting against the back of the hammer.

Figure 5:
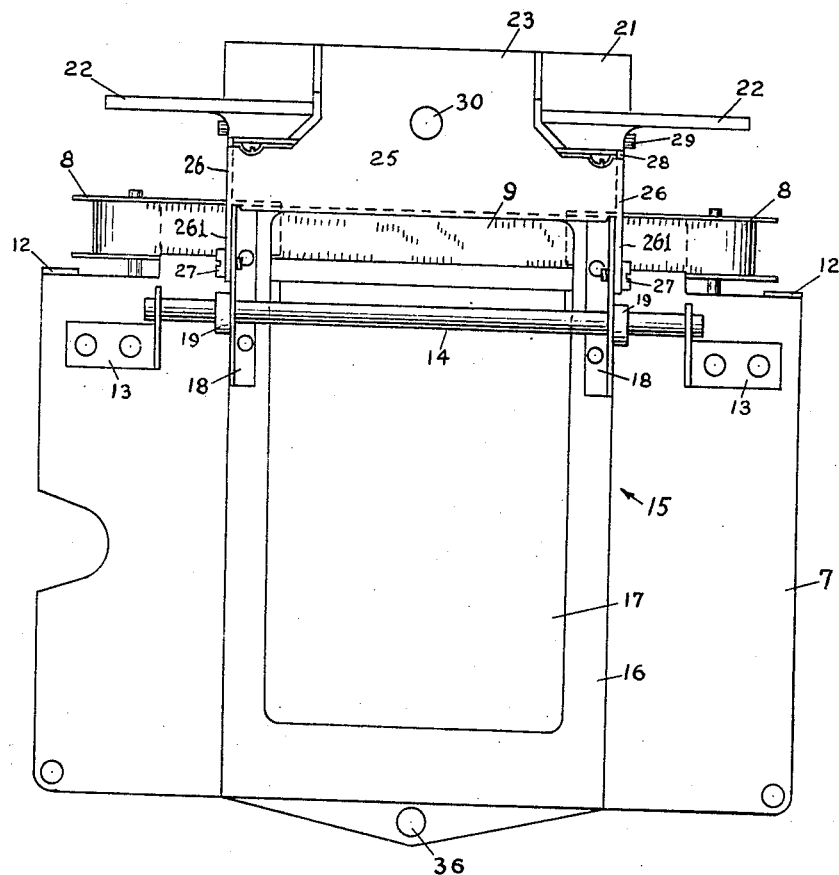
Fig. 5 is a rear elevation of the intermediate mounting plate and card receiver.

The card receiver 15 is of flat construction having a funnel entrance 20 to facilitate the entry of the card and having side grooves formed between the two skeleton plates 16 to receive the side edges of the card. The card lift (not shown) operates in the opening 17 (Fig. 5) formed by the skeleton construction of the plates 16. The card receiver is slidably mounted on the intermediate mounting plate 7 by means of shaft 14 which is held between the two mounting brackets 13 and which passes through holes in the bushings 19 which are secured to the rearwardly extending wings 18 of the card receiver.

Figure 3:
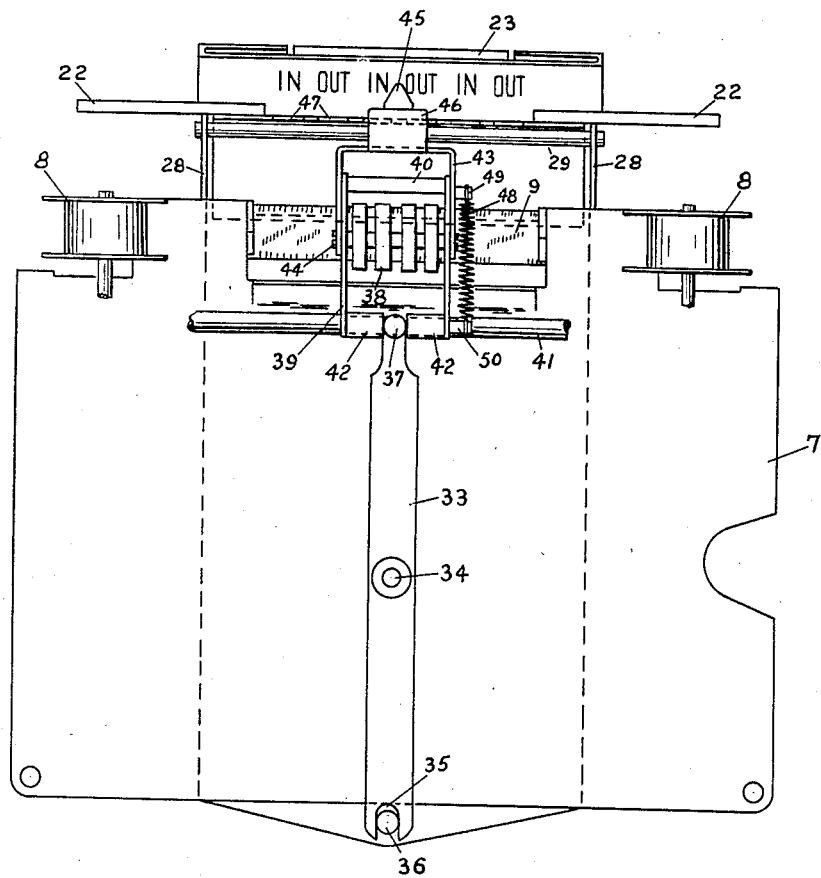
Fig. 3 is a front elevation of the intermediate mounting plate of the recorder with the card receiver mounted thereon and also diagrammatically shows the type wheel carriage and the manner in which it is interconnected with the card receiver.

Pivoted on the front of the intermediate mounting plate 7 at 34 is a rock lever 33 having its lower end connected to the card receiver by means of a slot 35 which fits over a pin 36 extending forwardly from the lower end of the card receiver. Rock lever 33 is provided at its upper end with a laterally extending knob 37 which engages an opening formed by the two stub posts 42 (Fig. 3) of the type wheel carriage. This carriage has been illustrated only diagrammatically on the drawing and comprises essentially two plates 39 held in parallel spaced relation by the pillars 40.

Extending between the plates 39 is a shaft 44 on which are loosely mounted the type wheels and associated gearing, indicated at 38. The type wheel carriage forms a part of the removable front sub-assembly (not shown) and is slidably mounted on shafts 41, only one of which is shown on the drawings. Thus the card receiver 15 and the type wheel carriage are positively interconnected by the rock lever 33, pivoted at its center 34, and any lateral movement of one must be accompanied by a simultaneous lateral movement of the other in the opposite direction.

Mounted on the type wheel carriage is a yoke member having two legs 43 extending downwardly outside of plates 39 and embracing the type wheel carriage. These legs are pivotally secured to the plates 39 at 44. The horizontal connecting portion of the yoke member has a narrowed portion 46 bent upwardly at an angle to form a tail at the forward end of the type carriage and a relatively narrow pointer portion 45 bent upwardly at right angles and forming an indicating pointer toward the back of the yoke. The movement of the yoke member about its pivots is limited in a backward direction by the legs 43 striking the screws which hold the upper left hand post or pillar 40 (Fig. 1) or by striking against a part of the card receiver when the front sub-assembly is in proper position as will be explained later, and in a forward direction by the horizontal connecting portion of the yoke striking against the upper edges of plates 39.

An over-center tension spring 48 has its upper end connected to the stud 49 on the right-hand leg 43 (Fig. 3) of the yoke member and its lower end connected to the stud 50 on the right-hand plate 39. Thus the spring 48 normally holds the yoke member in its rearward position with pointer 45 butting against the card receiver. However, when the tail 46 is pressed down the spring 48 snaps the yoke member to its forward position as soon as it has moved over center and retains it in this position. This movement of the yoke member is provided so that the yoke member can be moved to its forward position, disengaging the pointer from the card receiver so that it will not interfere with the removal of the front sub-assembly from the intermediate mounting plate when disassembling the recorder for service or repair.

The funnel portion of the card receiver is made of Bakelite and comprises a single molded member having a funnel opening 20 formed by sloping side walls 21 and having two horizontally extending plates 22 which serve to close those portions of the slot in the cover which are not occupied by the funnel proper. Pivotally mounted at 27 on the rearwardly extending wings 18 of the card receiver is an operating member 25 formed of a flat plate having two forwardly bent portions 26. Each of these portions 26 has a downwardly extending ear 261 by which the member is mounted on brackets 18 and forwardly extending ear 28, the two ears 28 embracing the card receiver. Extending between the two ears 28 is a rod 29 which lies directly back of the shank of pointer 45 when the yoke member is in its rearward or normal position.

The operating member 25 also has a narrowed flat portion 23 extending vertically to the top of the card funnel and having its upper end 24 bent forwardly and downwardly at an angle to complete the rear sloping face of the funnel opening. A cup like member 30 is secured to the portion 23 over a hole therein and a compression spring 32 is contained in this cup with one end against the end of the cup and the other end abutting against the portion 31 of the funnel. This compression spring holds the operating member in its rearward position with the rod 29 lying against the flange portion of the front plate 16 of the card receiver and free of the pointer 45.

A plurality of notches 47 are cut into the edge of the above mentioned flange of the front card receiver plate 16 and these notches are adapted to be engaged by the pointer 45. The front face of the funnel is labeled with suitable designations, such as the "In" and "Out" designation shown on the drawings, to indicate the column of the card in which the imprint will be made when the recorder is operated.

The manner in which the lateral shifting operation is accomplished is no doubt obvious from the foregoing description of the mechanism. The workman inserts his card in the card receiver and then grasps the end of the funnel between the thumb and second finger. This leaves the index finger free to engage the back of the operating member 25 at 23. The member is rotated slightly about its pivot points 27 in a clockwise direction causing the rod 29 to move the pointer 45 out of engagement with notch 47. The workman then moves the funnel to the right or left (Fig. 3) until the pointer 45 is opposite the proper notch 47. When the member 23 is released the pointer 45 enters the notch and the typewheel and card are in the proper relative position so that the imprint will be made in the selected column on the card. The push bar 60 can then be operated by the fingers of the hand which has inserted the card and made the necessary lateral adjustment of the receiver and type wheels.

From the foregoing it will be seen that the recorder is clearly a one-hand machine. The card is inserted and the push bar operated to effect the printing practically in one movement. In case it is necessary to adjust the lateral positioning mechanism, this may be quickly and easily done by the same hand without shifting the hand to a shifting lever located at the front of the recorder or in some other inconvenient place which requires extensive movement of the hand or the use of the other hand.

The present invention is disclosed in part in the co-pending Long application Serial No. 89,795 filed July 9, 1936, as a continuation in part of the above-mentioned co-pending Long application Serial No. 734,767, but is not claimed therein.

While only one embodiment of the invention has been disclosed, it will be apparent that modifications thereof may be made without departing from the spirit or scope of the invention as defined by the appended claims.

What is claimed is:

1. In a time recorder, type wheels, a card receiver mounted for relative lateral movement with respect to said type wheels and including a funnel to facilitate entry of the card, means for holding said receiver in any one of a number of laterally adjusted positions, and a manually operable member for rendering said last means ineffective, said member mounted on said card receiver and forming part of said funnel.

2. In a card recorder, a card receiver, a type carriage, movement transmitting means connecting said receiver and said carriage for effecting relative lateral movement therebetween, means for interlocking said receiver and said carriage independently of said last means, a funnel for said receiver grasped by the hand to effect the shifting operation, and a member operable by the same hand while grasping said funnel to release said interlocking means.

3. In a time recorder, a card receiver and a type wheel carriage mounted for relative lateral movement, a guide member on said card receiver having a plurality of notches therein, an indicating pointer rockably mounted on said type wheel carriage and adapted to engage said notches to interlock said receiver and said carriage in any one of a number of adjusted positions, and a manually operable member for disengaging said pointer to permit a shifting movement of said receiver, said member mounted on said card receiver adjacent the mouth thereof so as to be operable by the hand while grasping said receiver to effect lateral adjustment thereof.

4. In a time recorder, a movably mounted card receiver including a funnel to facilitate entry of the card, a type carriage, means for interlocking said receiver and said carriage in any one of a number of adjusted positions comprising a member on said receiver having a plurality of notches therein and a spring pressed pointer on said carriage engageable with said notches, and means for disengaging said pointer from said notches comprising a push plate forming a part of said funnel and operable by the hand grasping the funnel, whereby a shifting operation of said card receiver and said type carriage may be effected.

5. A lateral shifting means for a card recorder comprising a card receiver and a type carriage mounted for relative lateral movement, means for directly locking said card receiver and said type carriage together in any one of a number of adjusted positions, and a funnel for said card receiver to facilitate entry of a card having a part thereof movably mounted and operable by the hand grasping the funnel to release said locking means.

6. In a card recorder, a type carriage, a card receiver laterally movable relative to said type carriage, means for directly locking together said type carriage and said card receiver in any one of a number of predetermined adjusted positions, and a manually operable member for releasing said locking means, said member pivotally mounted on said card receiver adjacent to the mouth thereof and operable by the hand while grasping said receiver to effect lateral adjustment.

FLORENCE B. LONG,
*Administratrix of the Estate of Albert E. Long, Deceased.*